United States Patent [19]

Markisello

[11] Patent Number: 4,586,233

[45] Date of Patent: May 6, 1986

[54] METHOD OF DISABLING VARIOUS TYPES OF LOCK CYLINDERS IN GENERAL MOTORS MOTOR VEHICLES

[76] Inventor: Frank Markisello, 91-10 Liberty Ave., Ozone Park, N.Y. 11417

[21] Appl. No.: 608,580

[22] Filed: May 9, 1984

[51] Int. Cl.[4] .......... B23P 19/00

[52] U.S. Cl. .......... 29/426.4; 29/426.5; 29/402.19; 70/417

[58] Field of Search .......... 29/426.4, 426.5, 244, 29/252, 402.19; 70/417; 408/72, 703, 204

[56] References Cited

U.S. PATENT DOCUMENTS

| | | | |
|---|---|---|---|
| 2,566,145 | 8/1951 | Sandula | 408/72 X |
| 2,884,820 | 5/1959 | Pearce | 408/72 |
| 3,798,938 | 3/1974 | McCullum | 70/417 |
| 4,122,695 | 10/1978 | Hall | 70/417 |
| 4,167,222 | 9/1979 | El Bindari | 70/417 |
| 4,261,093 | 4/1981 | Steffen et al. | 408/703 X |

*Primary Examiner*—Charlie T. Moon

*Attorney, Agent, or Firm*—Michael I. Kroll

[57] ABSTRACT

A method of disabling various types of lock cylinders in General Motors motor vehicles is provided and consists of using two different types of guide tools that have key portions for engaging keyways of the lock cylinders so that either a drill bit or an elongated hole saw can engage one of the guide tools to disable the lock cylinders.

3 Claims, 10 Drawing Figures

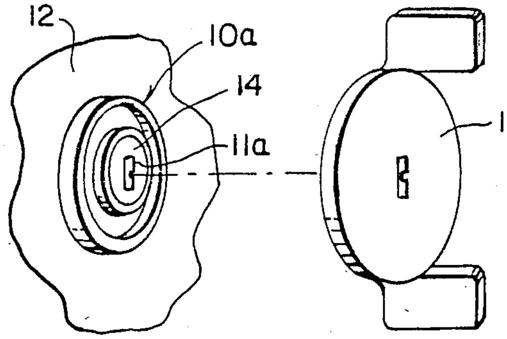
Figure 1
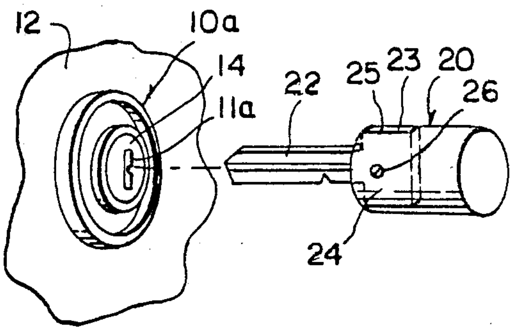
Figure 2
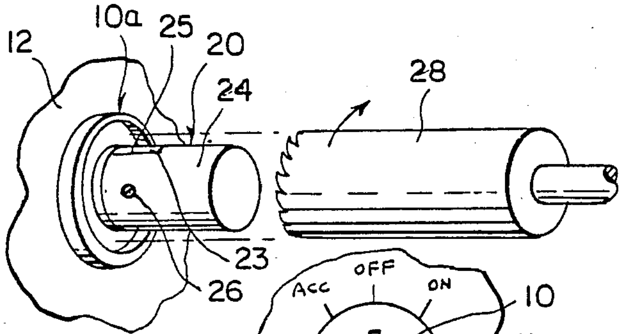
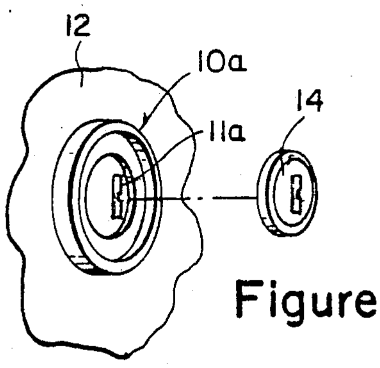
Figure 4
Figure 3
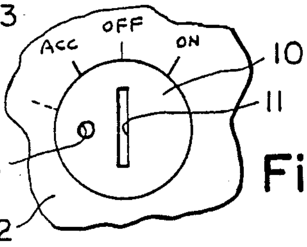
Figure 9
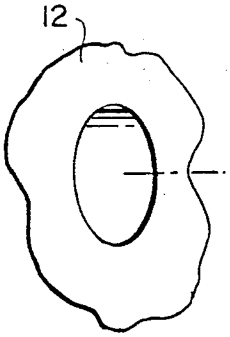
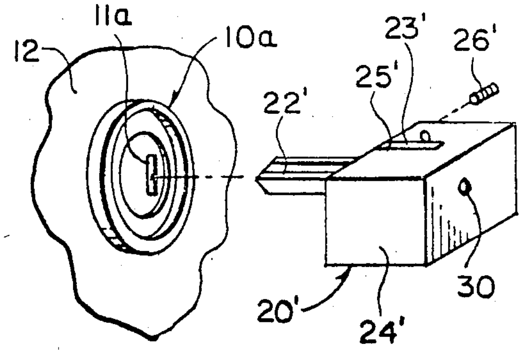
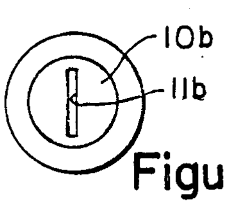
Figure 5
Figure 6
Figure 10
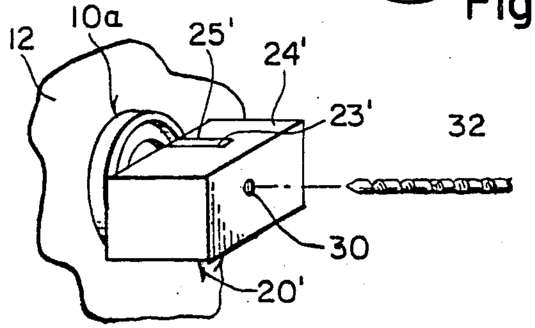
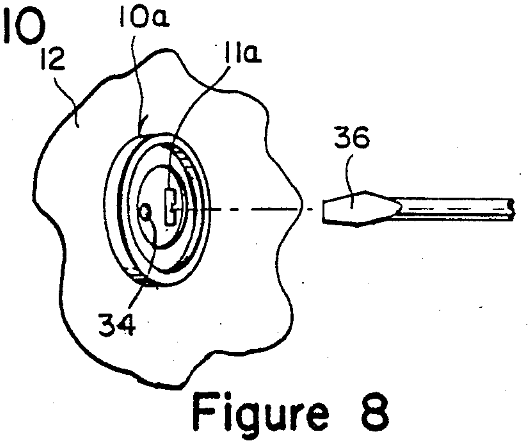
Figure 7
Figure 8

METHOD OF DISABLING VARIOUS TYPES OF LOCK CYLINDERS IN GENERAL MOTORS MOTOR VEHICLES

BACKGROUND OF THE INVENTION

1. Field of Invention

The instant invention relates generally to lock cylinders and more specifically it relates to a method of disabling various types of lock cylinders in General Motors motor vehicles.

2. Description of the Prior Art

Numerous lock cylinders have been provided in prior art that are adapted to be used for ignition, doors, tailgate, hatchback and trunks of General Motors motor vehicles, made between 1950 to the present. There is nothing on the market today that will open these lock cylinders easily if the keys for the lock cylinders are lost or missing, without the use of four different tool kits. Since there is no prior art units suitable for the particular purpose stated above, there is a need for the present invention as heretofore described.

SUMMARY OF THE INVENTION

A principle object of the present invention is to provide a method of disabling various types of lock cylinders in General Motors motor vehicles, one of which is an ignition lock cylinder from a motor vehicle made between 1950 to 1968 using a guide tool having a key portion inserted into the ignition lock cylinder so that a drill bit can disable the ignition lock cylinder side bar.

Another object is to provide a method of disabling various types of lock cylinders in General Motors motor vehicles, one of which is an ignition lock cylinder from a motor vehicle made between 1969 to 1978 using a cylindrical guide tool having a key portion inserted into the ignition lock cylinder so that an elongated hole saw can drill out the hardened steel disc, making it possible to screw a dent puller in the keyway and just pull the ignition lock cylinder out.

An additional object is to provide a method of disabling various types of lock cylinders in General Motors motor vehicles, one of which is an ignition lock cylinder from a motor vehicle made between 1979 to the present using both guide tools, the drill bit and elongated hole saw, for disabling the ignition lock cylinder, making it possible to just turn the ignition lock cylinder on to start the motor vehicle.

A still additional object is to provide a method of disabling various types of lock cylinders in General Motors motor vehicles, such as door, tailgate, hatchback or trunk lock cylinders from a motor vehicle made between 1950 to the present using a guide tool having a key portion inserted into the door, tailgate, hatchback and trunk lock so that a drill bit can disable the door, tailgate, hatchback and trunk lock cylinder side bar.

A further object is to provide a method of disabling various types of lock cylinders in General Motors motor vehicles whereby the two guide tools are economical in cost to manufacture.

A still further object is to provide a method of disabling various types of lock cylinders in General Motors motor vehicles whereby the two guide tools are simple and easy to use.

Further object of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is an exploded perspective view of a bezel removed from an ignition lock cylinder from 1969 to present in General Motors motor vehicles.

FIG. 2 is an exploded perspective view of a cylindrical guide tool ready to be placed into the ignition lock cylinder.

FIG. 3 is an exploded perspective view of an elongated hole saw ready to be placed over the cylindrical guide tool.

FIG. 4 is an exploded perspective view of a hard steel disc removed from the ignition lock cylinder.

FIG. 5 is an exploded perspective view of the ignition lock cylinder removed from 1969 to 1978 General Motors motor vehicles only.

FIG. 6 is an exploded perspective view of a second guide tool ready to be placed into an ignition lock cylinder from 1979 to present in General Motors motor vehicles.

FIG. 7 is an exploded perspective view of a drill bit ready to be placed through a pilot hole in the second guide tool to disable the side bar from 1979 to present in General Motors motor vehicles.

FIG. 8 is an exploded perspective view of a tip of a screwdriver ready to be placed into the lock cylinder to turn it to start position to drive the motor vehicle.

FIG. 9 is a front view of an ignition lock cylinder from a General Motors motor vehicle made between 1950 to 1968 and trucks up to 1979.

FIG. 10 is a front view of a lock cylinder from a door, tailgate, hatchback or trunk from a General Motors motor vehicle made between 1950 to present.

DETAILED DESCRIPTION OF THE PREFERRED EMBODIMENTS

Turning now descriptively to the drawings, in which similar reference characters denote similar elements throughout the several views, FIGS. 2 and 6 best illustrates the basic parts of the invention being guide tools 20 and 20'.

In FIG. 2 the guide tool 20 consists of a cylindrical portion 24 having a slot 25, a key portion 22 having a bow 23 that fits neatly into the slot 25 and a set screw 26 transversely mounted through the slot 25 in the cylindrical portion 24 and up against the bow 23 of the key to hold the key portion 22 securely thereto.

In FIG. 6 the guide tool 20' consists of a block portion 24' having a slot 25', a key portion 22' having a bow 23' that fits neatly into the slot 25' and a set screw 26' transversely mounted through the slot 25' in the block portion 24' and up against the bow 23' of the key to hold the key portion 22' securely thereto.

To understand how the guide tools 20 and 20' are used the following steps are described and illustrated in FIGS. 1 through 8 for: (A) Removing an ignition lock cylinder 10 that has a side bar (not shown) in a dashboard 12, from a General Motors motor vehicle made between 1950 to 1968 and trucks up to 1979; (B) Removing an ignition lock cylinder **10*a* that has a hard steel disc 14 from a General Motors motor vehicle 12** made between 1969 to 1978; (C) Turning on and off an ignition lock cylinder 10*a* that has a side bar (not shown), a hard steel disc 14 in a General Motors motor vehicle 12 made between 1979 to present; and (D) Opening a door, tailgate, hatchback or trunk lock cylinder 10*b* that has a side bar (not shown) in a General Motors motor vehicle 12 made between 1950 to present.

(A) Removing an ignition lock cylinder 10 that has a side bar (not shown) in a dashboard 12, from a General Motors motor vehicle made between 1950 to 1968 and trucks up to 1979.

1. Place the key portion 22' of the guide tool 20' that has a pilot hole 30 shown in FIG. 6 into the ignition lock cylinder 10 that has a keyway 11 shown in FIG. 9.
2. Place a drill bit 32 through the pilot hole 30 of the guide tool 20' shown in FIG. 7.
3. Drill the drill bit 32 into the poke hole 16 in the ignition lock cylinder 10 to disengage the side bar within.
4. Remove the drill bit 32 from the pilot hole 30 of the guide tool 20'.
5. Remove the key portion 22' of the guide tool 20' from the keyway 11 of the ignition lock cylinder 10.
6. Place tip 36 of the screwdriver shown in FIG. 8 into the keyway 11 of the ignition lock cylinder 10.
7. Turn the ignition lock cylinder 10 to accessory position.
8. Put a stiff wire (not shown) in the poke hole 16 in face of the ignition lock cylinder 10 and turn 1/16 of an inch further.
9. Remove the ignition lock cylinder 10 by hand.

(B) Removing an ignition lock cylinder 10*a* that has a hard steel disc 14 from a General Motors motor vehicle 12 made between 1969 to 1978.

1. Remove a bezel 18 from the ignition lock cylinder 10*a* (see FIG. 1).
2. Place the key portion 22 of the cylindrical guide tool 20 into the ignition lock cylinder 10*a* that has a keyway 11*a* (see FIG. 2).
3. Place an elongated hole saw 28 over the cylindrical guide tool 20 (see FIG. 3).
4. Drill the elongated hole saw 28 into the ignition lock cylinder 10*a*.
5. Remove the elongated hole saw 28 from the cylindrical guide tool 20.
6. Remove the key portion 22 of the cylindrical guide tool 20 from the keyway 11*a* of the ignition lock cylinder 10*a*.
7. Remove the hard steel disc 14 from the ignition lock cylinder 10*a* (see FIG. 4).
8. Screw a regular dent puller (not shown) into the keyway 11*a* of the ignition lock cylinder 10*a*.
9. Pull out the ignition lock cylinder 10*a* with the regular dent puller (see FIG. 5).

(C) Turning on and off an ignition lock cylinder 10*a* that has a side bar (not shown), a hard steel disc 14 in a General Motors motor vehicle 12 made between 1979 to present.

1. Remove a bezel 18 from the ignition lock cylinder 10*a* (see FIG. 1).
2. Place the key portion 22 of the cylindrical guide tool 20 into the ignition lock cylinder 10*a* that has a keyway 11*a* (see FIG. 2).
3. Place an elongated hole saw 28 over the cylindrical guide tool 20 (see FIG. 3).
4. Drill the elongated hole saw 28 into the ignition lock cylinder 10*a*.
5. Remove the elongated hole saw 28 from the cylindrical guide tool 20.
6. Remove the key portion 22 of the cylindrical guide tool 20 from the keyway 11*a* of the ignition lock cylinder 10*a*.
7. Remove the hard steel disc 14 from the ignition lock cylinder 10*a* (see FIG. 4).
8. Place the key portion of the second guide tool 20' that has a pilot hole 30 into the keyway 11*a* of the ignition lock cylinder 10*a* (see FIG. 6).
9. Place a drill bit 32 through the pilot hole 30 of the second guide tool 20' (see FIG. 7).
10. Drill the drill bit 32 into the ignition lock cylinder 10*a* to form a hole 34 to disengage the side bar within.
11. Remove the drill bit 32 from the pilot hole 30 of the second guide tool 20'.
12. Remove the key portion 22' of the second guide tool 20' from the keyway 11*a* of the ignition lock cylinder 10*a*.
13. Place tip 36 of a screwdriver into the keyway 11*a* of the ignition lock cylinder 10*a* (see FIG. 8).
14. Turn the ignition lock cylinder 10*a* on to start the motor vehicle 12.

(D) Opening a door, tailgate, hatchback or trunk lock cylinder 10*b* that has a side bar (not shown) in a General Motors vehicle 12 made between 1950 to present.

1. Place the key portion 22' of the guide tool 20' that has a pilot hole 30 shown in FIG. 6 into the door, tailgate, hatchback or trunk lock cylinder 10*b* that has a keyway 11*b*.
2. Place a drill bit 32 through the pilot hole 30 of the guide tool 20' shown in FIG. 7.
3. Drill the drill bit 32 into the door, tailgate, hatchback or trunk lock cylinder 10*b* to form a hole (not shown) to disengage the side bar within.
4. Remove the drill bit 32 from the pilot hole 34 of the guide tool 20'.
5. Remove the key portion 22' of the guide tool 20' from the keyway 11*b* of the door, tailgate, hatchback or trunk lock cylinder 10*b*.
6. Place tip 36 of a screwdriver shown in FIG. 8 into the keyway 11*b* of the door, tailgate, hatchback or trunk lock cylinder 10*b*.
7. Turn the door, tailgate, hatchback or trunk lock cylinder 10*b* to open position.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A method removing an ignition lock cylinder having a side bar in a dashboard from a General Motors motor vehicle made between 1950 to 1968 and trucks up to 1979 which comprises:

(a) inserting an interchangeably mounted key portion into a center slot of a block portion of a guide tool having a pilot hole so that the proper key portion can be readily used for the respective ignition lock cylinder having the side bar;

(b) placing the key portion of the guide tool having the pilot hole into the ignition lock cylinder having a keyway;

(c) placing a drill bit through the pilot hole of the guide tool;

(d) drilling the drill bit into a poke hole in the ignition lock cylinder to disengage the side bar within;

(e) removing the drill bit from the pilot hole of the guide tool;

(f) removing the key portion of the guide tool from the keyway of the ignition lock cylinder;

(g) placing tip of a screwdriver into the keyway of the ignition lock cylinder;

(h) turning the ignition lock cylinder to accessory position;

(i) putting a stiff wire in the poke hole in face of the ignition lock cylinder and turn at least one degree further; and (j) removing the ignition lock cylinder by hand.

2. A method of turning on and off an ignition lock cylinder having a side bar, a hard steel disc in a General Motors motor vehicle made between 1979 to present which comprises:

(a) removing a bezel from the ignition lock cylinder;

(b) inserting an interchangeably mounted key portion into a center slot of a cylindrical portion of a cylindrical guide tool so that the proper key portion can be readily used for the respective ignition lock cylinder having the side bar and the hard disc;

(c) placing the key portion of the cylindrical guide tool into the ignition lock cylinder having a keyway;

(d) placing an elongated hole saw over the cylindrical guide tool;

(e) drilling the elongated hole saw into the ignition lock cylinder;

(f) removing the elongated hole saw from the cylindrical guide tool;

(g) removing the key portion of the cylindrical guide tool from the keyway of the ignition lock cylinder;

(h) removing the hard steel disc from the ignition lock cylinder;

(i) inserting an interchangeably mounted key portion into a center slot of a block portion of a second guide tool having a pilot hole so that the proper key portion can be readily used for the respective ignition lock cylinder having the side bar and the hard disc;

(j) placing the key portion of the second guide tool having a pilot hole into the keyway of the ignition lock cylinder;

(k) placing a drill bit through the pilot hole of the second guide tool;

(l) drilling the drill bit into the ignition lock cylinder to form a hole to disengage the side bar within;

(m) removing the drill bit from the pilot hole of the second guide tool;

(n) removing the key portion of the second guide tool from the keyway of the ignition lock cylinder;

(o) placing tip of a screwdriver into the keyway of the ignition lock cylinder; and (p) turning the ignition lock cylinder on to start the motor vehicle.

3. A method of opening a door, tailgate, hatchback, trunk lock cylinder having a side bar in a General Motors motor vehicle made between 1950 to the present which comprises:

(a) inserting an interchangeably mounted key portion into a center slot of a block portion of a guide tool having a pilot hole so that the proper key portion can be readily used for the respective door, tailgate, hatchback, and trunk lock cylinder having a side bar;

(b) placing the key portion of the guide tool having the pilot hole into the door, tailgate, hatchback, trunk lock cylinder having a keyway;

(c) placing a drill bit through the pilot hole of the guide tool;

(d) drilling the drill bit into the door, tailgate, hatchback, trunk lock cylinder to form a hole to disengage the side bar within;

(e) removing the drill bit from the pilot hole of the guide tool;

(f) removing the key portion of the guide tool from the keyway of the door, tailgate, hatchback, trunk lock cylinder;

(g) placing tip of a screwdriver into the keyway of the door, tailgate, hatchback, trunk lock cylinder; and (h) turning the door, tailgate, hatchback, trunk lock cylinder to open position.

* * * * *